Feb. 10, 1942.   R. MORF ET AL   2,272,951
PROCESS FOR THE EXTRACTION OF SUBSTANCES AS WELL
AS MIXTURES OF SUBSTANCES
Filed Nov. 4, 1938
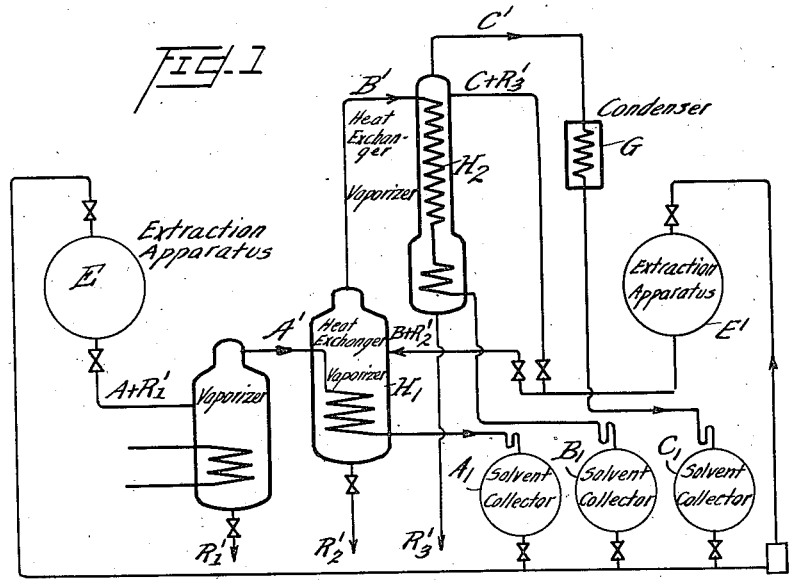
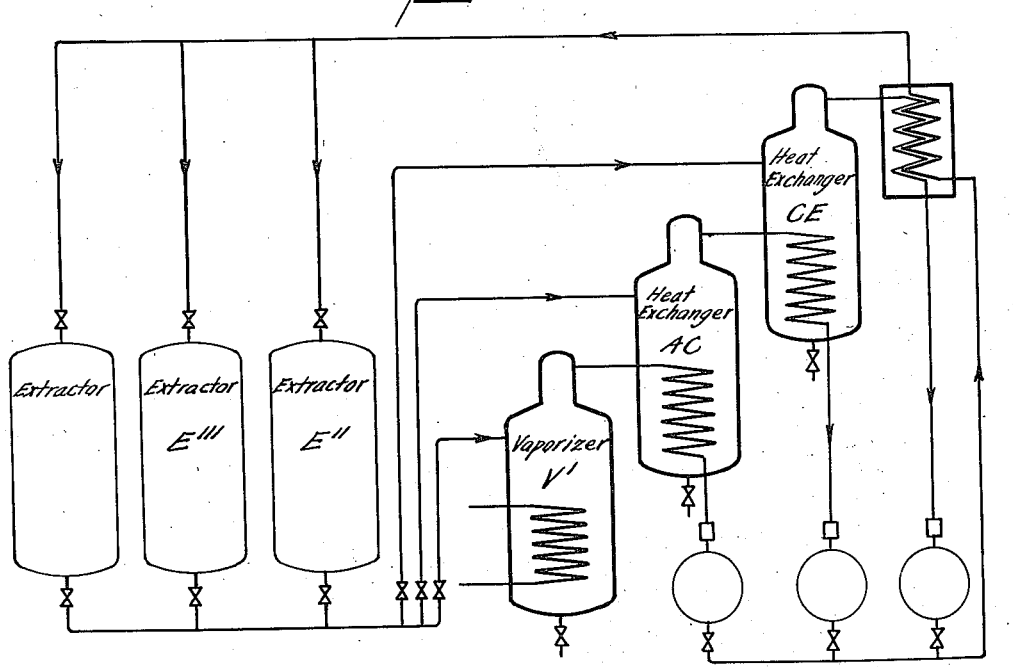
Inventors
Rudolf Morf,
Gerard Cornaz
by Sommers + Young Attorneys Patented Feb. 10, 1942

2,272,951

UNITED STATES PATENT OFFICE 2,272,951

PROCESS FOR THE EXTRACTION OF SUBSTANCES AS WELL AS MIXTURES OF SUBSTANCES

Rudolf Morf, Kyburg, and Gérard Cornaz, Winterthur, Switzerland

Application November 4, 1938, Serial No. 238,922
In Switzerland November 22, 1937

1 Claim. (Cl. 202—45)

This invention relates to processes for the extraction of substances and of mixtures of substances.

In previously known extraction processes the fuel and refrigerant costs are responsible for a large part of the expense involved. Therefore a number of proposals are in existence tending towards a reduction of these costs.

For instance the provision of several extractors to an extraction battery enables working according to the principle of enrichment. Especially if the process of enrichment by way of counter current is adopted, a considerable saving of fuel can be obtained, as only highly saturated extract solutions must be evaporated.

It has now been ascertained that a considerable improvement of the energy balance of the extraction procedure can be attained by using several substances and mixtures of substances as subsidiary materials in the extraction process and repeatedly transferring the evaporation heat of the different solvents to other solvents, without adding any further external energy in any form to the system.

The accompanying drawing illustrates by way of example only the procedure for carrying the process according to the invention into effect.

Fig. 1 is a schematic illustration of extracting apparatus for carrying out the process according to the invention in general;

Fig. 2 is a schematic illustration of an apparatus for extracting betuline.

In the extraction apparatus E, which may be of ordinary construction, the material to be extracted, that is, raw material R, is treated with a solvent A. According to general practice, for example by filtration, a miscellany $A+R_1'$ is obtained. This miscellany $A+R_1'$ is then separated by evaporation in evaporator V into the extract $R_1'$ and the vapor of solvent $A'$. According to the invention, this vapor of the solvent $A'$ is condensed in a heat-exchanger $H_1$. In heat exchanger $H_1$ heat exchange takes place between the solvent vapor $A'$ and a miscellany $B+R_2'$ from another extractor $E'$. The solvent vapor $A'$ being condensed, its condensation heat is fully or partly transferred to the miscellany $B+R_2'$, which is evaporated to an extent depending on the relative condensation and evaporation heats of the solvents A and B. This heat-exchange takes place without the addition of any external heat to the system. The condensed solvent is passed to reservoir $A_1$ and is used again in the extraction circuit whereas the vapor of the solvent $B'$ from the evaporated miscellany $B+R_2'$ enters a new heat exchange apparatus $H_2$ together with a third miscellany $C+R_3'$ which passes thereto from extractor $E'$. In this second heat exchange step the heat of condensation of the vapor $B'$ is transferred fully or partly to a miscellany $C+R_3'$, also supplied from extractor $E'$ without the addition of any external energy. This second heat exchange step produces condensed solvent B which passes to reservoir $B_1$, the solvent vapor $C'$ and the extract $R_3'$. The solvent B after passing through reservoir $B_1$ may again enter its extraction circuit whereas the vapor $C'$ can be used in a third heat exchange step, serving to supply heat to this step, or if this should be without economical importance can be condensed in an ordinary manner in condenser G, and pass to a reservoir $C_1$ from which it may be used as solvent in its extraction circuit again. The above described process of coupled extraction and heat exchange can be carried out with any substances and solvents with which a sufficient difference of temperature between the heat delivering material and the boiling temperature of the heat absorbing miscellany can be produced by a suitable choice of the auxiliary materials.

For most of the solvents employed in the process the latent heat of evaporation reaches a higher value than the palpable heat, so that in the primary state the heat consumed by the hitherto applied extraction processes can be represented by the following relation:

Heat consumed for the evaporation of the solvent used for the extraction of 1 kg. of extract $$R' = \frac{1}{\dfrac{a}{Q_A}}$$

heat units per kg. whereby $a$ is the numerical value of the amount of extract $R'$ which can be extracted by 1 kg. of the solvent A. $Q_A$ represents the heat of evaporation of the solvent A.

Making use of two different solvents, the materials A and B in the combined extraction and heat-exchange-process described above, one needs for the evaporation of the solvents necessary for the extraction of 1 kg. of extract $R'$ $$\frac{1}{\dfrac{a}{Q_A}+\dfrac{b}{Q_B}}$$

heat units per kg. of extract. $Q_B$ signifies the heat of evaporation of the solvent B; $b$ represents the solubility of the extract $R'$ in the solvent B. Working according to this invention with 3 auxiliary substances as solvents, namely the materials A, B and C whose amounts of heat of evaporation are indicated by $Q_A$, $Q_B$ and $Q_C$ and whose potencies of solubility for the extract R' are given by $a$ kg., respectively $b$ kg. and $c$ kg.

extract R' per kg. of solvents A, B and C respectively, the heat consumption in the primary state amounts to $$\frac{1}{\frac{a}{Q_A}+\frac{b}{Q_B}+\frac{c}{Q_C}}$$

heat units per kg. of extracted R'. The above determination clearly shows the economical advantage of the described combination of extraction and heat exchange process. The use of several solvents as auxiliary means always works out to a thermic advantage compared with a hitherto known extraction process, if the quotient of dissolving power and latent heat of evaporation of the solvents is a positive figure:

$$\frac{a}{Q_A}>0$$

$$\frac{b}{Q_B}>0$$

$$\frac{c}{Q_C}>0$$

$$\frac{z}{Q_Z}>0$$

According to the present invention, it is thus possible, by a suitable choice of the auxiliary solvents and of their number, to realize an important saving of energy.

Instead of extracting only one material with several mixtures of materials as solvents, one can also carry out the extraction of several materials with several extraction solvents in the combined extraction- and heat-exchange-process, in order to achieve an advantage in heat-economy.

It is also possible to carry out the extraction with different substances as extraction solvents in one and the same extraction apparatus.

Further it is possible to mix several extraction solvents and to bring vapor mixture and miscellany mixture in reciprocal heat exchange. The combined extraction and heat exchange process with several accessory materials as extraction solvents according to the invention permits further a considerable reduction of the condensation cost to a similar extent as the attainable saving of heat in comparison with known processes.

A further essential advantage lies in the simplicity and moderate cost of the apparatus. The whole system works under the same pressure so that the connections between the evaporators and condensers or other heat exchangers are of very simple construction. The heat exchanger serves at the same time as condenser and evaporator, so that considerably smaller surfaces are required for the heat exchange in comparison with known apparatuses capable of similar performances.

The example of the method represented in Fig. 2 relates to the extraction of betuline.

In an extractor (E'') pulverized bark of birch trees is treated with alcohol as extraction solvent. The nascent miscellany of alcohol and betuline is evaporated in an evaporator V' after filtration.

Betuline-extract and alcohol vapor are formed. The alcohol vapor is conducted into the heat-exchanger (A—C) by an ordinary connecting tube, where heat exchange takes place between alcohol vapor and betuline-miscellany, which contains chloroform as extraction solvent. The chloroform containing miscellany can be produced either in a separate extraction apparatus (E''') or in the extractor (E'').

In the heat exchanger (A—C) alcohol vapor is condensed by the evaporation of chloroform containing miscellany to an extent depending on the relative heats of evaporation and the energy contents of the two materials in heat exchange. This heat exchange takes place without the addition of external energy of any kind.

Now the condensed alcohol can begin its extraction circuit anew. By the heat-exchange in (A—C) chloroform vapor and betuline extract are obtained. The chloroform vapor is conveyed by a connecting pipe into a heat exchanger C—E, where heat exchange takes place between the chloroform vapor and an ether containing miscellany of betuline without addition of external energy the chloroform vapor gives up its heat of condensation partially or entirely to the ether containing miscellany, which is to be evaporated, thereby condensing itself. This condensed chloroform can begin its extraction and heat exchange circuit again.

The ether vapor which has been formed beside the betuline extract in the heat exchanger (C—E) can again undergo heat exchange, acting as heat supplier, or in case this should not be economical, may be condensed in an ordinary manner and be used again as extraction solvent.

The essential consumption of heat for the evaporation of the extraction solvents can be calculated as follows in the primary state.

Dissolving power of alcohol for betuline $$a=0.04$$

Heat of evaporation of alcohol $$Q_A=220 \text{ heat-units}$$

Dissolving power of chloroform for betuline $$b=0.04$$

Heat of evaporation of chloroform $$Q_B=61 \text{ heat units}$$

Dissolving power of ether for betuline $$c=0.03$$

Heat of evaporation of ether $$Q_C=85 \text{ heat units}$$

The heat consumption per kg. of betuline extract amounts, after the example carried out in the primary state and assuming that only saturated betuline miscellanies are evaporated, to the following value:

$$\frac{1}{\frac{0.04}{220}+\frac{0.04}{61}+\frac{0.03}{85}}=$$

840 heat units per kg. betuline extract.

On the other hand if betuline is extracted with alcohol alone, after well known processes the heat consumption is $$\frac{Q_A}{a}=5500 \text{ heat units per kg. betuline extract.}$$

The extraction of betuline according to well known processes by means of chloroform alone, requires 1520 heat units per kg. of betuline extract.

The use of ether as extraction solvent, as per methods already known requires a heat consumption of 2840 heat units per kg. betuline extract.

Various changes and modifications may be made in the practice of our invention without departing from the principle or spirit thereof, by adding customary practice and established knowledge of the art to the present disclosure and the scope of the appended claim is not to be regarded as limited except as specified therein.

We claim:

A method for the extraction of substances, comprising separately treating material to be extracted with a plurality of different, separate solvents having different boiling points to produce a plurality of separate solvent-extracts, then separately evaporating the solvent having the highest boiling point from its solvent-extract, bringing the vapors of the solvent having the highest boiling point into heat-exchange relationship with the solvent-extract of the solvent having the next lower boiling point while maintaining said solvents separate to transfer the latent heat of the vapors of the solvent having the higher boiling point to the solvent-extract of the solvent having the next lower boiling point, thereby condensing the higher boiling solvent and causing the said lower boiling solvent to evaporate, without any more external energy being used than is necessary to evaporate the solvent with the highest boiling point, and without any pressure difference being necessary between the solvent vapors and the solvent-extracts involved in the heat exchange, condensing the lower boiling solvent, and collecting said solvents separately.

RUDOLF MORF.
GÉRARD CORNAZ.